Fig. 4
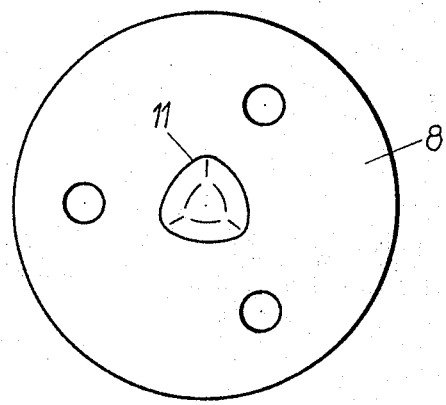
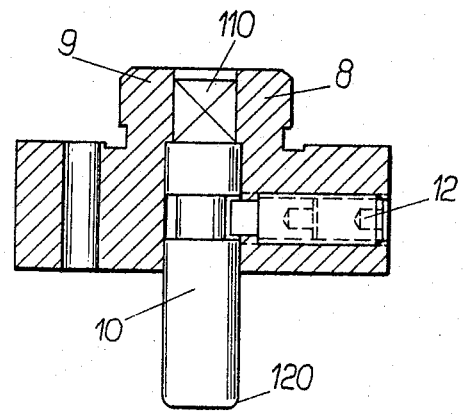
Fig. 3

United States Patent Office 3,452,580
Patented July 1, 1969

3,452,580
METHOD AND MACHINE FOR THE MANUFACTURE OF SOLDER SWEAT FITTINGS
Karl E. Witzig, Greutterwaldstrasse 19, Weilimdorf, Germany, and Rudolf Frank, Am Zuckerberg 41, Ludwigsburg, Germany
Filed Nov. 8, 1966, Ser. No. 592,880
Int. Cl. B21b *17/02;* B21d *53/00;* B21k *29/00*
U.S. Cl. 72—370      7 Claims

ABSTRACT OF THE DISCLOSURE

A fitting blank is retained in a die 5 (FIG. 2, station 1), precut (station 2) and then enlarged for the reception of tubing with a solder sweat connection by a polygonal tool (FIG. 4) having smoothly rounded edges and rounded sides, and rotating as it is fed into the blank (FIG. 2, station 3); the die is then indexed to a final machining and cut-off position (FIG. 2, station 4), thus enabling manufacture on a single rotary machine tool of the turret type without punching.

---

The present invention relates to a method of automatically manufacturing fittings for use in the plumbing industry, and particularly of the solder-sweat type, made of a ductile material such as copper; and to an apparatus to automatically manufacture these fittings on rotary power machine tools from raw blanks without intermediate handling.

Solder-sweat fittings of copper or other similar solderable ductile and tough material are used in large quantities. They may be cast; in another method of manufacture, however, they are made of drawn, pre-formed tubing. The final shape, including the enlarged end openings to receive the copper piping or tubing is then formed by means of molten lead, or oil in a forming press. The pre-formed fitting blank is cut to approximately size in a machine tool, which may be rotary and semi-automatic. Thereafter, the blank is placed into another machine, such as a press, in which a stamping head forms the end pieces of the fitting to enlarge them to receive the tubing which may ultimately be soldered or sweated unto the fitting. The now almost finished fitting is then removed from the press and placed on yet another machine, which cuts the fitting to exact external dimensions and finishes it to provide for proper size of the internal diameter to receive the tubing; further, the ends may be beveled or chamfered.

The above described method, while resulting in good fittings, requires repeated handling of the fittings between machining and requires a plurality of machines. The frequent resetting of the fitting into different machines is time consuming and inefficient.

It has been proposed to utilize a single machine, such as a turret lathe or the like, to pre-cut the blank, enlarge the end portions, and then finally finish the fittings. This, however, resulted in difficulty because the expansion of the blank was carried out with a reciprocating, linearly acting press which is difficult, or impossible to combine with turret lathes, or turret milling machines.

It is an object of the present invention to provide a method, and a single machine tool to manufacture fittings, automatically on rotary machines, and which does not require re-loading of the fittings repeatedly into different machinery.

The present invention thus release to a method, and to a machine tool, which enables the expansion of the diameter of a seamless fitting blank, in the region where it is to receive the tube to which it is to be sweated and soldered, without the use of a separate press. A fitting, having been pre-cut for size, is held in a die and a rotating expansion enlarging tool is introduced or fed into the blank. The enlarging tool has a projecting head of a polygonal cross section, with smoothly rounded corners, to press the walls of the fitting blank against pre-formed walls of the die. The smooth surface of the head, and the rounded corners, provide a smooth internal finish which is exceptionally good to receive solder and to provide for accurate size of the finished fitting. The expanded fitting is then, still held in the same die, indexed to another position where it is cut to final finished length dimensions.

The structure, organization and operation of the invention will now be described more specifically in the following detailed description with reference to the accompanying drawings, in which:

FIG. 3 is a side view, partly in section, of a tool used in forming the expanded section of the fitting;

FIG. 4 is a bottom view of the tool of FIG. 3; and

Figure 1:
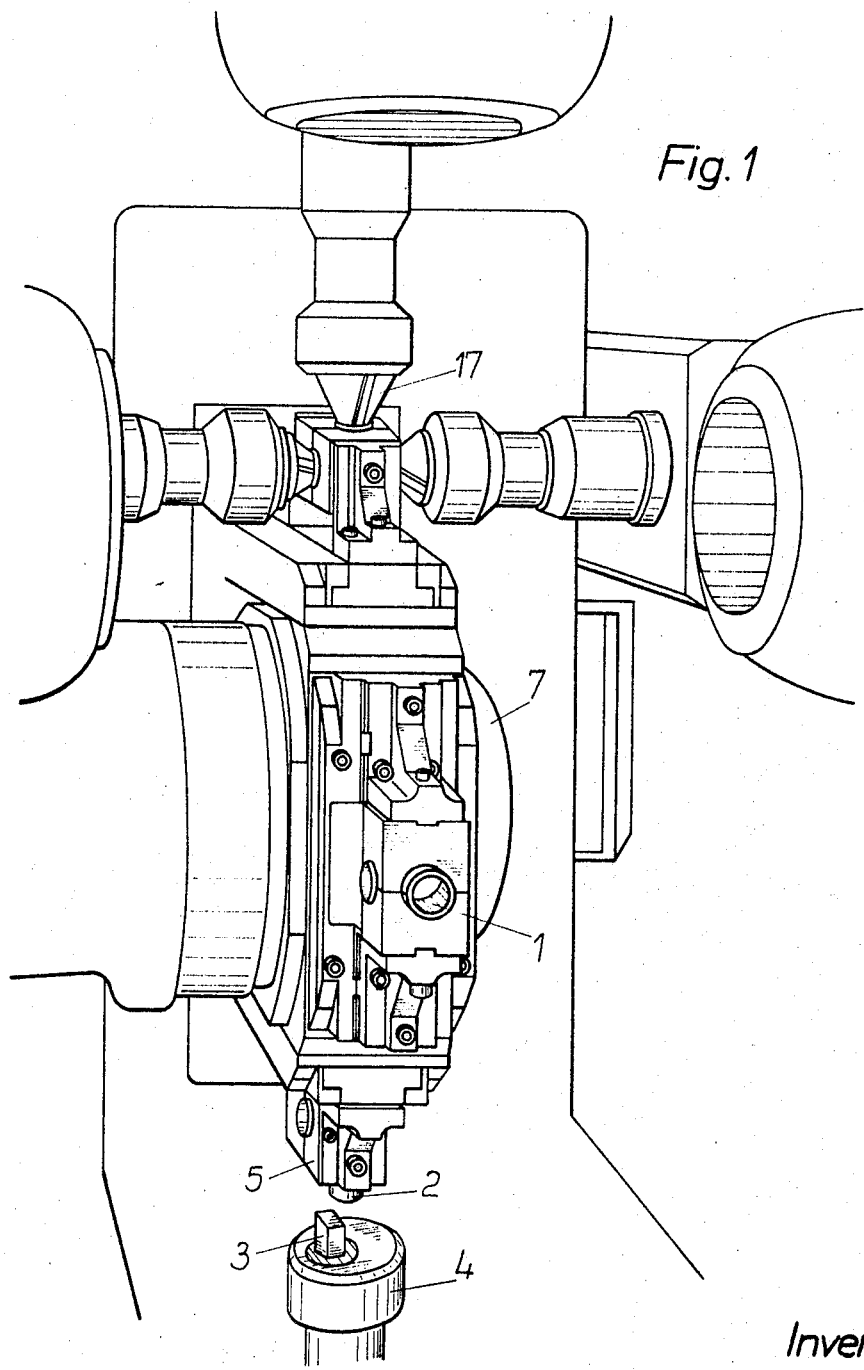
FIG. 1 is a general view of a machine tool in accordance with the invention, partly in perspective, and partly in schematic, and partly in exploded view presentation.

The process according to the present invention will be illustrated in connection with a forming of a T-sweat-solder fitting. Referring particularly to FIG. 2, a blank 1 is formed in the general shape of a T. It is provided with the usual extrusion cap 2, shown in dot-dashed form, which is cut off at one position of a turret machine tool, such as a turret milling machine or turret lathe. The cut-off is by means of cutter 3, held in a work spindle 4 (bottom of FIG. 1). The fitting itself is contained within the die 5 which has the general outer shape which the fitting is to have after having been machined. In the region of 6, the die is shaped with recesses to accept a deformation of the fitting in the area where the tubing to which the fitting is to be soldered is pushed thereinto.

Initially, the fitting is retained in the die, which preferably consists of two parts as seen in FIG. 2, in connection with station 1. After cutting off of cap 2, the die, retained in an indexing head 7 (FIG. 1) is indexed one position (to a position not seen in FIG. 1) to be carried to station 3 (FIG. 2). In station 3, the fitting is expanded in the region where it is to accept the tubing and to match the shape of the die at 6. The expansion of the fitting is done by means of a tool which is further illustrated in FIGS. 3–5.

The tool is held in a holder 8 with which it can be retained in the work spindle of a turret machine tool, and which contains a portion 9 to be fitted into the machine tool. A recess, or bore within the holder 8, is formed with a square end 110, into which the enlarging tool itself is fitted, so as to rotate with tool holder 8. It is prevented from removal from the tool holder by means of a set screw 12, engaging a groove within the tool, as well known in the art. The expansion tool 10, itself, has a polygonal cross sectional area, as clearly seen in the bottom view of FIG. 4. The polygonal is formed in such a way that the edges thereof are rounded off; the surfaces are smooth and also rounded, but yet present regions which are of lesser distance from the center of the tool than the rounded corners. A particularly useful form of cross section is an approximately equilateral triangle, with slightly rounded sides and rounded corners. The surface of the enlarging tool is smooth; it may be chrome plated, hard chromed, and highly polished. It is also possible to manufacture the enlarging tool by making only the region of the smooth and rounded corners of a hard steel. The edges 11 of the tool are parallel with respect to each other. In certain form it may be desirable to have them extend towards each other in a conical form, as seen at the tip 15 of FIG. 5; edges need not be parallel to the axis of the tool, as illustrated at 130, but may be skewed with respect thereto, so as to have spiral form. The end edges, as seen at 120, are also rounded in order to permit ready entry into the tubing blank. Instead of the profile shown in FIG. 4, that is of an equilateral triangle, other polygonal cross sectional shapes may be used, such as squares, or pentagons. Nevertheless, it is important that the edges are rounded and that the tool is smoothly polished.

Figure 5:
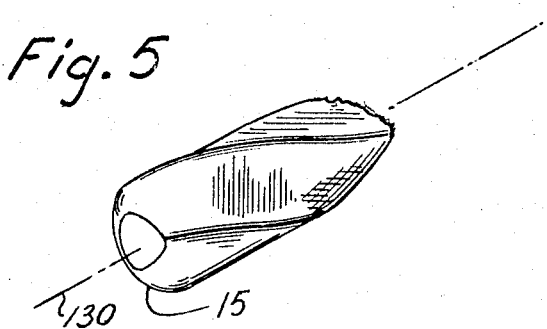
FIG. 5 is a perspective view of a modified form of tool according to the invention.

In station 3, tools in accordance with FIGS. 3–5, are introduced into the ends of the fitting in the region of enlargement of the die 6. They are rotating, as they are being fed into the tubing blank. The wall of the fitting is then pressed against the inner wall of the die 6. Practical results have shown that the rotating enlarging tool, as shown in FIGS. 3–5, provide excellent surface characteristics to the fitting blank, while at the same time resulting in but little wear on the tool, thus providing for long usefulness of the tool in the machine itself. While feeding the rotating tool into the fitting, lubrication can be provided by introducing lubricants such as oil, through a central bore 16, formed in the tool (see FIG. 2, station 3). The center of rotation of the tool will remain fixed with respect to the center of rotation of the blank so as to provide smooth matching of the fitting blank against the surfaces of the fitting die.

Figure 2:
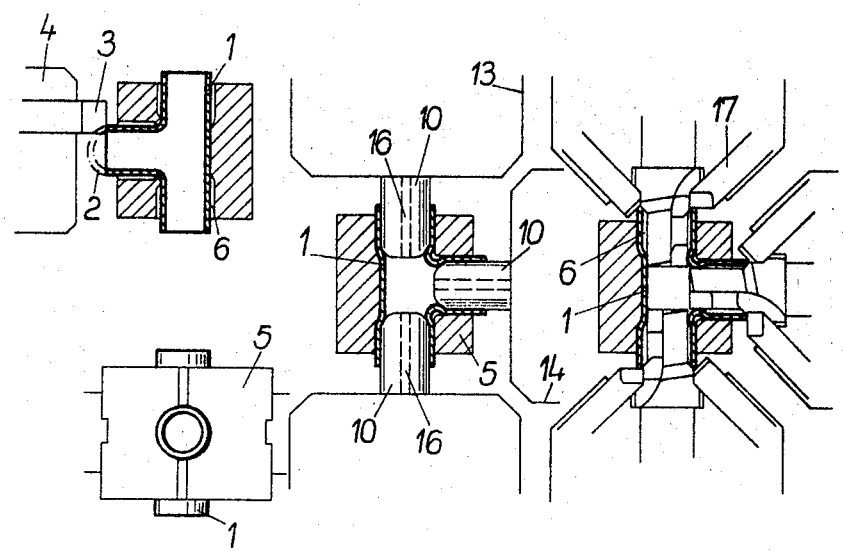
FIG. 2 is an illustration of the series of steps used in the forming of the fitting, illustrating stations 1, 2, 3 and 4 separately, each in partly sectional top view.

After the enlarging process, station 3 in FIG. 2, is finished, the tool is retracted into its initial, retracted position, and the die in the enlarged blank is indexed another step, see top of FIG. 1. The now enlarged fitting is cut to exact size, illustrated by cutters 17 (FIG. 1; FIG. 2, station 4). Upon the next indexing, the die is opened, the fitting is released from the die, and a new raw fitting can be inserted, as seen at station 1, FIG. 2, and at 1 in FIG. 1. The new fitting is then again cut to approximate size by cutter 4 and the process repeats with the next fitting.

The machine tool, and a method of forming fittings to enlarge the ends with rotating tools is not restricted to T-fittings, but may likewise be used with elbows, end caps, conversion attachments, reducers or expanders, and any other fitting for use with sweat-solder connections in the plumbing, or similar fields.

We claim:
1. Method of manufacturing seamless sweat fittings from blanks of ductile material of substantially uniform diameter to have, in the region of the solder connection, an enlarged diameter of predetermined dimensions comprising retaining a fitting blank in a die having, in said region of solder connection, a portion of enlarged cross sections to accept deformed fitting material and define the outer diameter thereof; feeding a spreading tool, having a polygonal cross section and parallel edges with rounded corners and smooth, polished surfaces, into the blank opposite said region of enlarged cross section of the die, while rotating said polygonal, smooth polished tool about a center of rotation fixed with respect to the center of the blank to gradually enlarge the diameter of said blank in said region by forming it against said die in said region of enlarged cross section.

2. Machine tool to manufacture seamless sweat-solder fittings from tubular blanks of ductile material of substantially uniform diameter to have, in the region of sweat connections, an enlarged diameter of uniform predetermined dimensions comprising a work holding die having a holding portion to grip said blank and having cylindrical end portions of enlarged diameter to receive the region of the sweat connection; and an enlarging tool comprising a projecting head of polygonal cross section having rounded corners and rounded parallel edges and a smooth polished suface, said enlarging tool being mounted for feeding movement into said die as well as for simultaneous rotary movement about a central axis of said blank to expand the blank retained in said die against said region of enlarged dimeter within said die upon introduction thereinto while rotating.

3. Machine tool as claimed in claim 2 wherein the cross section of said head is a rounded equilateral triangle.

4. Machine tool as claimed in claim 4 wherein the corners formed by said triangle are smoothly rounded off and the sides are rounded out.

5. Machine tool as claimed in claim 2 wherein the surface of the head is hardened by a chrome finish and highly polished.

6. Machine tool as claimed in claim 2 wherein the edges of the head are skewed about a central axis thereof.

7. Machine tool as claimed in claim 2 wherein said head is formed with a central bore to supply lubricant.

References Cited

UNITED STATES PATENTS

| | | | |
|---|---|---|---|
| 1,993,361 | 3/1935 | Cornell | 29—157 |
| 2,025,973 | 12/1935 | Cornell | 29—157 |
| 2,181,577 | 11/1939 | Cartwright | 29—157 |
| 2,206,741 | 7/1940 | Cornell | 29—157 |
| 2,243,809 | 5/1941 | Wendel | 29—157 |
| 2,653,562 | 9/1953 | Tinsman et al. | 72—24 |
| 3,303,680 | 2/1967 | Thielsch | 72—58 |
| 2,679,681 | 6/1954 | Resler | 72—324 |

FOREIGN PATENTS 565,662  11/1944  Great Britain.

CHARLES W. LANHAM, *Primary Examiner.*

E. M. COMBS, *Assistant Examiner.*

U.S. Cl. X.R.

29—157